United States Patent
Li et al.

(10) Patent No.: US 11,531,126 B2
(45) Date of Patent: Dec. 20, 2022

(54) CALIBRATION METHOD AND SYSTEM FOR PHOTON OR PARTICLE COUNTING DETECTORS

(71) Applicant: Arizona Board of Regents on Behalf of the University of Arizona, Tucson, AZ (US)

(72) Inventors: Xin Li, Tucson, AZ (US); Lars Furenlid, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 210 days.

(21) Appl. No.: 17/040,456

(22) PCT Filed: Mar. 22, 2019

(86) PCT No.: PCT/US2019/023746
§ 371 (c)(1),
(2) Date: Sep. 22, 2020

(87) PCT Pub. No.: WO2019/183594
PCT Pub. Date: Sep. 26, 2019

(65) Prior Publication Data
US 2021/0026026 A1 Jan. 28, 2021

Related U.S. Application Data

(60) Provisional application No. 62/647,446, filed on Mar. 23, 2018.

(51) Int. Cl.
*G01T 7/00* (2006.01)
*G01T 1/20* (2006.01)
(Continued)

(52) U.S. Cl.
CPC ............... *G01T 7/005* (2013.01); *G01T 1/202* (2013.01); *G01T 1/2018* (2013.01); *G01T 1/2964* (2013.01)

(58) Field of Classification Search
CPC ...... G01T 1/2964; G01T 1/202; G01T 1/2018; G01T 7/005
See application file for complete search history.

(56) References Cited

U.S. PATENT DOCUMENTS

| 4,823,016 | A | | 4/1989 | Yamashita et al. |
| 6,054,949 | A | * | 4/2000 | Grassmann ........ G01R 29/0892 342/383 |
| 2010/0270462 | A1 | | 10/2010 | Nelson et al. |

FOREIGN PATENT DOCUMENTS

| WO | WO-0057131 A1 * | 9/2000 | ........... G01C 15/002 |
| WO | WO-2006007584 A2 * | 1/2006 | ........... A61N 5/1048 |
| WO | WO 2018/081404 | 5/2018 | |

OTHER PUBLICATIONS

Xin Li and Lars R. Furenlid, "Fast Monolithic Detector Calibration Method—a simulation study" IEEE (Year: 2018).*
(Continued)

*Primary Examiner* — Edwin C Gunberg
(74) *Attorney, Agent, or Firm* — Leydig, Voit & Mayer, LTD.

(57) ABSTRACT

The present invention provides a method of calibrating gamma-ray and photon counting detectors, including, but not limited to, monolithic crystal detectors. The method of the present invention is based on the observation that measurement of fan beam datasets allows the synthesis of collimated beam data to derive MDRFs by use of an algorithm that finds the common or intersecting data subsets of two or more orthogonal calibration datasets. This makes the calibration process very efficient while still allowing the full benefits of maximum-likelihood event-parameter esti- (Continued)

mation that incorporates the statistical nature of the light sensor measurements.

20 Claims, 12 Drawing Sheets

(51) Int. Cl.
    *G01T 1/202*     (2006.01)
    *G01T 1/29*     (2006.01)

(56) References Cited

OTHER PUBLICATIONS

Borghi et al. (2015) "Experimental Validation of an Efficient Fan-Beam Calibration Procedure for k-Nearest Neighbor Position Estimation in Monolithic Scintillator Detectors," IEEE Transactions on Nuclear Science, 62(1): 57-67.

Chen et al. (2005) "Calibration of Scintillation Cameras and Pinhole SPECT Imaging Systems," Chapter 12 in Small-Animal SPECT Imaging, M.A. Kupinski and H.H. Barrett (Eds.) Springer Science and Business Media, pp. 195-201.

España et al. (2013) "Fast calibration of SPECT monolithic scintillation detectors using un-collimated sources," Physics in Medicine and Biology, 58(14):4807-4825.

International Search Report and Written Opinion dated Jul. 19, 2019 in International Application No. PCT/US2019/023746, from which the present application claims priority, 12 pp.

Jeong et al. (2003) "Position mapping, energy calibration, and flood correction improve the performances of small gamma camera using PSPMT," In Nuclear Science Symposium Conference Record, 2003 IEEE, vol. 3, pp. 2103-2107.

Li et al. (2010) "Nonlinear least-squares modeling of 3D interaction position in a monolithic scintillator block," Physics in Medicine and Biology, 55(21): 6515-6532.

Lyu et al. (2014) "A Maximum Likelihood Gamma Positioning Method with Accurate Calibration of the Mean Detector Response Function in a Clinical SPECT Detector," 2014 IEEE NSS/MIC; Conference [online]. Nov. 8-15, 2014 [retrieved May 21, 2019]. Retrieved from https://ieeexplore.ieee.org/document/7430928. 4 pp.

Peterson (2011) "SPECT detectors: the Anger Camera and beyond," Physics in Medicine and Biology, 56(17): R145-R182.

\* cited by examiner a)

b)

a)

b)

CALIBRATION METHOD AND SYSTEM FOR PHOTON OR PARTICLE COUNTING DETECTORS

CROSS-REFERENCE TO RELATED APPLICATIONS

This application is a U.S. National Stage Application filed under 35 U.S.C. § 371 of International Application No. PCT/US2019/023746, filed Mar. 22, 2019, which claims the benefit of U.S. Provisional Application No. 62/647,446, filed Mar. 23, 2018. Both of these applications are hereby incorporated by reference in their entireties.

STATEMENT REGARDING FEDERALLY SPONSORED RESEARCH OR DEVELOPMENT

This invention was made with government support under Grant No. P41 EB002035, awarded by NIH. The government has certain rights in the invention.

BACKGROUND OF THE INVENTION

Monolithic-crystal gamma-ray detector designs are the simplest approach to imaging gamma rays. They can yield good planar (X, Y) spatial resolution and in some cases 3D (i.e., X, Y, Z) spatial resolution together with good energy and timing resolution. Such detectors are widely used in modern single-photon emission computed tomography (SPECT) systems and positron emission tomography (PET) systems. FIG. 1, panel a, shows a basic geometrical configuration of a typical monolithic scintillation crystal detector.

If a gamma-ray is absorbed at a specific location inside the scintillation crystal of the monolithic crystal detector, energy from the gamma-ray will be converted into a burst of secondary visible photons, called the scintillation photons. The scintillation photons will travel inside the monolithic crystal detector, until either detected by light sensors or absorbed somewhere inside the detector. If the interaction position is close to a light sensor, the light sensor will produce a larger signal. In contrast, if the interaction position is farther away from the light sensor, the light sensor will produce a smaller signal. The relative signal strengths of the light sensors are then used to estimate the position and energy attributes of each gamma-ray interaction. Similar methods are used in detectors for particles and detectors for other forms of electromagnetic radiation, such as X-ray detectors.

Anger-arithmetic methods consisting of simple linear combinations of signals are conventionally used to estimate gamma-ray interaction position for monolithic-crystal gamma-ray detectors (Peterson and Furenlid 2011, "*SPECT detectors: the Anger Camera and beyond*," Physics in Medicine and Biology, 56(17): R145-R182). Although such methods are relatively simple and fast to use, significant performance is sacrificed in that images are extremely distorted. Heuristic position corrections are traditionally made to correct for the distortion, but at the expense of introducing correlations in the data that can yield artifacts in final reconstructed tomographic images. Anger arithmetic also does not work near detector edges, resulting in a significant loss of usable detector area.

In order to utilize the full potential of monolithic crystal detectors for the detection of gamma-rays, X-rays, other forms of electromagnetic radiation, and particles, reference-data-based methods such as least-mean-square error (LMSE), contracting-grid search and vector searching, k nearest neighbor (KNN) or maximum-likelihood estimation (MLE) can be used, which yields an improved spatial resolution with almost no distortion (bias) and permits use of virtually the entire detector area.

However, in order to apply these methods, detector calibration is necessary to determine the detector sensors response as a function of gamma-ray interaction position (or other form of electromagnetic radiation interaction position or particle interaction position). That is, it is necessary to make measurements of each light sensor's signal response as a function of the interaction position. If measurements are combined from many events in a given area into an average value, these response functions are called the "mean detector response functions (MDRFs)."

For example, if there are 20 light sensors, there will be 20 MDRFs. Each MDRF represents one light sensor's mean signal response as a function of gamma-ray, X-ray, or particle interaction position. If the detector is a 2D detector, the MDRF is a 2D function; however, if the detector is a 3D detector in which the depth of interaction (DOI) can also be determined, the MDRF is a 3D function. For some estimation algorithms such as KNN, all the events at each calibration location are retained individually in a list to form a reference dataset. The invention described herein is equally applicable to these methods.

After the calibration procedure is complete and the detector is being used for imaging experiments, each gamma-ray (or other form of electromagnetic radiation or particle) event's corresponding set of light sensor signals (signal vector) can be compared with the MDRFs to estimate the interaction position (where the mean-square error is minimum, or likelihood is maximum). Accurate measurement of the calibration data is a key part to use these methods and thereby improve the imaging performance of existing and new monolithic-crystal scintillation detectors.

Five existing methods are primarily used to calibrate detectors: 1) scanning with a thin collimated beam, 2) scanning with a grid of thin collimated beams, 3) simulate MDRFs through modeling, 4) calibration using un-collimated sources, and 5) fan beam calibration. However, each of these methods has significant disadvantages, such as being very time consuming or being unable to calibrate depth of interaction information. Accordingly, what is needed is an improved method for detector calibration.

SUMMARY OF THE INVENTION

The present invention provides a method of calibrating gamma-ray, X-ray, other forms of electromagnetic radiation, charge particle, and photon counting detectors, including, but not limited to, monolithic crystal detectors and semiconductor detectors. This new method, also referred to herein as "common data subset (CDS) calibration", is based on the observation (not obvious even to those skilled in the art) that measurement of fan beam datasets allows the synthesis of collimated beam data to derive reference datasets, particularly MDRFs, by use of an algorithm that finds the common data subsets of two or more calibration datasets. The reference datasets, preferably MDRFs, are then used to more accurately estimate an event's position within the detector, thereby allowing an image to be adjusted or enhanced, or a more accurate image to be generated. The present invention makes the calibration process very efficient while still allowing the full benefits of maximum-likelihood event-parameter estimation that incorporates the statistical nature of the sensor measurements.

In an embodiment, the present invention provides a method for calibrating particle detectors and/or electromagnetic radiation detectors, including but not limited to gamma-rays and X-rays, comprising the steps of: a) illuminating the detector with a first particle or electromagnetic radiation beam, wherein the first particle or electromagnetic radiation beam illuminates the detector in a first defined region in the detector and generates a first plurality of sensor signals; b) detecting the first plurality of sensor signals and generating a first dataset, wherein the first dataset comprises data corresponding to positions where the first particle or electromagnetic radiation beam interacts with the detector; c) illuminating the detector with a second particle or electromagnetic radiation beam, wherein the second particle or electromagnetic radiation beam illuminates the detector in a second defined region in the detector and generates a second plurality of sensor signals, wherein the second region intersects the first region and wherein the first region and second region are different; and d) detecting the second plurality of sensor signals and generating a second dataset, wherein the second dataset comprises data corresponding to positions where the second particle or electromagnetic radiation beam interacts with the detector. In an embodiment, the sensor signals are induced by scintillation photons.

Positional data subsets are then identified that are common to both the first and second datasets, and a reference dataset is generated from the common positional data subsets. As used herein, a "reference dataset" comprises collected data points, statistical information, positional data, collected wavelength data, energy vector data, mean values, generated mean detector response functions (MDRFs), and combinations thereof. In an embodiment, an imaging scan is performed utilizing the detector, and the image is generated, enhanced and/or adjusted based on the generated reference dataset. In an embodiment, a mean detector response function (MDRF) is generated from the common positional data subsets. A further embodiment comprises performing an imaging scan utilizing the detector, and generating, enhancing and/or adjusting the image based on the generated MDRF.

In an embodiment, the particle or electromagnetic radiation detector described herein is for a type of electromagnetic radiation and the particle or electromagnetic radiation beams are electromagnetic radiation beams. In an embodiment, the electromagnetic radiation is selected from the group consisting of: gamma-rays, X-rays, visible light, UV light, and combinations thereof. In an embodiment, the detector is a gamma-ray detector and the particle or electromagnetic radiation beams are gamma-ray beams. In an embodiment, the detector is an X-ray detector and the particle or electromagnetic radiation beams are X-ray beams.

In an embodiment, the particle or electromagnetic radiation detector described herein is a particle detector, and the particle or electromagnetic radiation beams are particle beams. In an embodiment, the particles are selected from the group consisting of protons, electrons, neutrons, ions, alpha particles, beta particles, and combinations thereof. In an embodiment, the particles are charged particles.

A further embodiment comprises the additional steps of illuminating the detector with a third particle or electromagnetic radiation beam, wherein the third particle or electromagnetic radiation beam illuminates the detector in a third defined region and generates a third plurality of position-dependent signals, wherein the third region intersects the first and second regions; detecting the third plurality of sensor signals and generating a third dataset, wherein the third dataset comprises data corresponding to positions where the third gamma-ray beam interacts with the detector. In an embodiment, the sensor signals are induced by scintillation photons. The positional data subsets are then identified that are common to the first, second and third datasets; and a reference dataset is generated for the detector from the common positional data subsets. In an embodiment, a mean detector response function (MDRF) is generated for the detector from the common positional data subsets.

Optionally, the first region is in a first plane and the third region is in a second plane, which is orthogonal to the first plane. Alternatively, the first region is in a first plane and the third region is in a second plane which is oriented at an angle between 0 to 90 degrees to the first plane, at an angle between 15 to 75 degrees to the first plane, at an angle between 30 to 60 degrees to the first plane, or at an angle of approximately 45 degrees to the first plane. Optionally, the first and second regions are co-planar (i.e., they are located within the same plane). Preferably, the generated reference dataset is contains three-dimensional data. In an embodiment, a mean detector response function (MDRF), preferably a three-dimensional MDRF, is generated from the common positional data.

A further embodiment comprises the additional steps of illuminating the detector with one or more additional particle or electromagnetic radiation beams, wherein each of the one or more additional particle or electromagnetic radiation beams illuminates the detector in an additional defined region and generates an additional plurality of sensor signals, wherein each additional region intersects the first region and is a different region in the detector than a region illuminated by another particle or electromagnetic radiation beam; detecting the additional plurality of sensor signals and generating an additional dataset for each of the one or more additional particle or electromagnetic radiation beams, wherein each of the additional datasets comprises data corresponding to positions where the additional one or more particle or electromagnetic radiation beams interact with the detector. The one or more additional particle or electromagnetic radiation beams may comprise at least a fourth particle or electromagnetic radiation beam, at least a fifth particle or electromagnetic radiation beam, at least a sixth particle or electromagnetic radiation beam, etc. For example, the detector may be illuminated with four or more particle or electromagnetic radiation beams (or five or more, or six or more, etc.), where each particle or electromagnetic radiation beam illuminates an additional defined region in the detector and generates an additional positional data subset. In an embodiment, the sensor signals are induced by scintillation photons. The positional data subsets that are common to multiple or all of the particle or electromagnetic radiation beams illuminating the detector are identified and a reference dataset is generated for the detector from the common positional data subsets. In an embodiment, the positional data subsets that are common to multiple or all of the particle or electromagnetic radiation beams illuminating the detector are identified and a mean detector response function (MDRF) is generated. In an embodiment, the use of multiple particle or electromagnetic radiation beams may enable faster or more precise calibration of the detector.

Preferably, the first region is in a first plane and each additional region illuminated by the one or more additional particle or electromagnetic radiation beams is in an additional plane which is oriented at an angle between 0 to 90 degrees to the first plane, at an angle between 15 to 75 degrees to the first plane, at an angle between 30 to 60 degrees to the first plane, or at an angle of approximately 45 degrees to the first plane. Optionally, each additional region is in an additional plane that is orthogonal to the first plane; however, it is not necessary for the particle or electromagnetic radiation beams to be orthogonal to one another. In an embodiment, the use of multiple particle or electromagnetic radiation beams having multiple angles can be used to generate a reference dataset for the intersected positions. In an embodiment, the use of multiple particle or electromagnetic radiation beams having multiple angles can be used to calculate the MDRF value at intersected positions. For example, three or more scans can be used where each beam has a different angle but not orthogonal to one another. By increasing the number of angles, the present method may become more robust in certain applications. Additionally, the data acquisition time at each angle can be decreased to balance the total data acquisition time.

In an embodiment, the particle or electromagnetic radiation detector is illuminated with one or more adjacent particle or electromagnetic radiation beams, wherein the one or more adjacent particle or electromagnetic radiation beams illuminate the detector in one or more additional defined regions and generate an additional plurality of sensor signals. The one or more additional regions intersect the first region but are adjacent to the second region and do not intersect the second region. The additional plurality of sensor signals from the one or more adjacent particle or electromagnetic radiation beams are used to generate one or more additional datasets, wherein the one or more additional datasets comprises data corresponding to positions where the one or more adjacent particle or electromagnetic radiation beams interact with the detector. These positions are adjacent to, but do not include, the positions where the first and second regions intersect. Thus, by eliminating or factoring in these adjacent positions, the positions where the first and second regions intersect can be determined with greater accuracy. The positional data subsets that are common to the first and second datasets but exclude the one or more additional datasets are identified; and a reference dataset is generated. In an embodiment, the positional data subsets that are common to the first and second datasets but exclude the one or more additional datasets are identified; and a mean detector response function (MDRF) is generated.

In an embodiment, prior to generating a reference dataset, or, in an embodiment, a mean detector response function (MDRF) from the common positional data subsets, data from the first or second data subsets are processed. Preferably, the method further comprises one or more of: creating artificial data points in the first or second data subset; randomly deleting data points in the first or second data subset; giving more weight to data points in the first or second data subset; and adjusting the influence radius or influence region of each event in the first or second data subset. For example, if the merit field extended by each event is a multivariable Gaussian function, then adjusting the covariance matrix of each variable will help to balance the summed merit field of the whole dataset.

In an embodiment, slits or other devices are used with the particle or electromagnetic radiation beams to provide specified shapes or sizes to the regions illuminated by the particle or electromagnetic radiation beams. For example, the defined regions illuminated by the particle or electromagnetic radiation beams (including the first, second, and third defined regions and any additional defined regions) will have, independently from one another, a shape which includes, but is not limited to, a line shape, rectangular shape, circular shape, oval shape, cone shape, triangular shape, polygonal shape, or irregular shape.

In an embodiment, the particle or electromagnetic radiation beams used herein are fan beams. Optionally, the detectors comprise edge readout detectors, semiconductor detectors, and/or monolithic crystal detectors as are known in the art. In an embodiment, the present invention is used to calibrate detectors used in single-photon emission computed tomography (SPECT) and positron emission tomography (PET) devices.

In an embodiment, the present invention provides a method for calibrating a gamma-ray detector comprising the steps of: a) illuminating the gamma-ray detector with a first gamma-ray beam, wherein the first gamma-ray beam illuminates the detector in a first defined region in the detector and generates a first plurality of sensor signals; b) detecting the first plurality of sensor signals and generating a first dataset, wherein the first dataset comprises data corresponding to positions where the first gamma-ray beam interacts with the detector; c) illuminating the gamma-ray detector with a second gamma-ray beam, wherein the second gamma-ray beam illuminates the detector in a second defined region in the detector and generates a second plurality of sensor signals, wherein the second region intersects the first region and wherein the first region and second region are different; and d) detecting the second plurality of sensor signals and generating a second dataset, wherein the second dataset comprises data corresponding to positions where the second gamma-ray beam interacts with the detector. In an embodiment, the sensor signals are induced by scintillation photons. In an embodiment, positional data subsets are then identified that are common to both the first and second datasets, and reference dataset for the detector is generated from the common positional data subsets. In an embodiment, positional data subsets are then identified that are common to both the first and second datasets, and a mean detector response function (MDRF) for the detector is generated from the common positional data subsets. A further embodiment comprises performing an imaging scan utilizing the detector and generating, enhancing and/or adjusting the image based on the generated reference dataset. A further embodiment comprises performing an imaging scan utilizing the detector and generating, enhancing and/or adjusting the image based on the generated MDRF.

In an embodiment, the present invention provides a method for calibrating an X-ray detector comprising the steps of: a) illuminating the X-ray detector with a first X-ray beam, wherein the first X-ray beam illuminates the detector in a first defined region in the detector and generates a first plurality of sensor signals; b) detecting the first plurality of sensor signals and generating a first dataset, wherein the first dataset comprises data corresponding to positions where the first X-ray beam interacts with the detector; c) illuminating the X-ray detector with a second X-ray beam, wherein the second X-ray beam illuminates the detector in a second defined region in the detector and generates a second plurality of sensor signals, wherein the second region intersects the first region and wherein the first region and second region are different; and d) detecting the second plurality of sensor signals and generating a second dataset, wherein the second dataset comprises data corresponding to positions where the second X-ray beam interacts with the detector. In an embodiment, the sensor signals are induced by scintillation photons. In an embodiment, positional data subsets are then identified that are common to both the first and second datasets, and reference dataset for the detector is generated from the common positional data subsets. In an embodiment, positional data subsets are then identified that are common to both the first and second datasets, and a mean detector response function (MDRF) for the detector is generated from the common positional data subsets. A further embodiment comprises performing an imaging scan utilizing the detector and generating, enhancing and/or adjusting the image based on the generated reference dataset. A further embodiment comprises performing an imaging scan utilizing the detector and generating, enhancing and/or adjusting the image based on the generated MDRF.

In an embodiment, the present invention provides a system for detecting a particle or electromagnetic radiation, said system comprising: a) at least one particle or electromagnetic radiation detector comprising: (i) at least one sensor having a front surface, a back surface, and one or more edge surfaces, wherein said at least one sensor is able to generate signal signals in response to an interaction event between a portion of the sensor and said particle or electromagnetic radiation; b) means for illuminating selected regions of the at least one particle or electromagnetic radiation detector with a particle or electromagnetic radiation beam; and c) a microprocessor configured to receive signal signals generated by the at least one sensor and generate data corresponding to positions of the interaction events between the particle or electromagnetic radiation beam and the sensor.

In an embodiment, the present invention provides a system for detecting a particle or electromagnetic radiation, said system comprising:

a) at least one particle or electromagnetic radiation detector comprising: (i) at least one scintillator crystal having a front surface, a back surface, and one or more edge surfaces, wherein said at least one scintillator crystal is able to generate scintillation photons in response to an interaction event between a portion of the scintillator crystal and said particle or electromagnetic radiation, and (ii) one or more photodetectors in optical communication with the at least one scintillator crystal, said one or more photodetectors able to receive generated scintillation photons exiting the at least one scintillator crystal and generate electrical signals in response to said received photons;

b) means for illuminating selected regions of the at least one particle or electromagnetic radiation detector with a particle or electromagnetic radiation beam; and c) a microprocessor configured to receive electrical signals generated by the one or more photodetectors and generate data corresponding to positions of the interaction events between the particle or electromagnetic radiation beam and the scintillator crystal.

In an embodiment, the microprocessor is configured to: (i) illuminate the at least one particle or electromagnetic radiation detector with a first particle or electromagnetic radiation beam in a first defined region in the at least one particle or electromagnetic radiation detector, and generate a first dataset, wherein the first dataset comprises data corresponding to positions where the first particle or electromagnetic radiation beam interacts with the at least one particle or electromagnetic radiation detector; (ii) illuminate the at least one particle or electromagnetic radiation detector with a second particle or electromagnetic radiation beam in a second defined region in the at least one particle or electromagnetic radiation detector, and generate a second dataset, wherein the second dataset comprises data corresponding to positions where the second particle or electromagnetic radiation beam interacts with the at least one particle or electromagnetic radiation detector; (iii) identify positional data subsets that are common to both the first and second datasets, and generate a reference dataset, preferably a mean detector response function (MDRF), for the at least one particle or electromagnetic radiation detector from the common positional data subsets; and (iv) perform an imaging scan of an object utilizing the at least one particle or electromagnetic radiation detector and generating, enhancing and/or adjusting an image of the object based on the generated MDRF. In an embodiment, the microprocessor is further configured to estimate coordinates, including lateral coordinates and depth of interaction coordinates, of an interaction event within the detector.

In a further embodiment, microprocessor is further configured to: illuminate the at least one particle or electromagnetic radiation detector with a third particle or electromagnetic radiation beam in a third defined region in the at least one particle or electromagnetic radiation detector, and generate a third dataset, wherein the third dataset comprises data corresponding to positions where the third particle or electromagnetic radiation beam interacts with the at least one particle or electromagnetic radiation detector, and identify positional data subsets that are common to the first, second and third datasets, and generate a mean detector response function (MDRF) for the at least one particle or electromagnetic radiation detector from the common positional data subsets. Preferably, the first region is in a first plane and the third region is in a second plane which is oriented at an angle between 0 to 90 degrees to the first plane, and the generated MDRF is a three-dimensional MDRF.

The means for illuminating the selected regions of the detector comprise a particle source or electromagnetic radiation source able to provide a beam at a desired energy level, size, and position, including but not limited to, electron, proton and neutron generators, X-ray generators, and gamma-ray generators as known in the art. In an embodiment, the scintillation crystal is a monolithic crystal detector.

In an embodiment, the at least one particle or electromagnetic radiation detector comprises scintillation sensors optionally further comprises a light guide able to transmit scintillation photons exiting the at least one scintillator crystal to the one or more photodetectors, and may further comprises an edge readout detector. Additionally, the at least one particle or electromagnetic radiation detector further comprises a photomultiplier positioned between the at least one scintillator crystal and one or more photodetectors. The photomultipliers are able to magnify the photons generated by the scintillation crystal for detection by the photodetector. The scintillation crystals may further have Lambertian reflector material placed on the entrance and exit faces of the detector.

In an embodiment, the system further comprises a slit able to shape the particle or electromagnetic radiation beams into a linear shape, rectangular shape, circular shape, oval shape, cone shape, triangular shape, polygonal shape, or irregular shape. Each beam used to calibrate the detector may pass through the same or a different slit. For example, one slit may be used for beams across the X direction while a second slit is used for beam across the Y direction. Preferably, each beam passes through the same slit that has been repositioned to illuminate the appropriate region of the detector to ensure uniformity. For example, in an embodiment the same slit is rotated 90° to provide beams across the X and Y directions. Depending on the type of particle or electromagnetic radiation beam, the thickness of the slit will vary. For example, for optical detectors using visible light, the slit may be very thin. For higher energy radiation, the thickness of the slit will be greater.

In an embodiment, the system further comprises a mask positioned over the detector, wherein the mask blocks one or more portions of the beams from illuminating the detector. For example, the mask may comprise a series of holes where the beams are only able to pass through the holes. The resulting beam will not form a continuous illuminating beam, but instead will only form a beam on the detector in a pattern that corresponds to the holes in the mask. This can be used to refine the data generated from the detector leading to reference datasets, specifically MDRFs that are more accurate.

In an embodiment, the present invention provides a method for calibrating detectors comprising the steps of: a) illuminating the detector with a first particle or electromagnetic radiation beam, wherein the first particle or electromagnetic radiation beam illuminates the detector in a first direction across the detector and generates a first plurality of sensor signals; b) detecting the first plurality of sensor signals and generating a first dataset, wherein the first dataset comprises data corresponding to positions where the first particle or electromagnetic radiation beam interacts with the detector; c) illuminating the detector with a second particle or electromagnetic radiation beam, wherein the second particle or electromagnetic radiation beam illuminates the detector in a second direction across the detector and generates a second plurality of sensor signals, wherein the second direction is orthogonal to the first direction; d) detecting the second plurality of sensor signals and generating a second dataset, wherein the second dataset comprises data corresponding to positions where the second particle or electromagnetic radiation beam interacts with the detector; e) identifying positional data subsets that are common to both the first and second datasets; and f) generating a mean detector response function (MDRF) for the detector from the common positional data subsets. In an embodiment, the sensor signals are induced by scintillation photons.

Optionally, the first and second directions are co-planar, such as a vertical and horizontal axis on a detector. A further embodiment comprises the additional steps of illuminating the detector with a third particle or electromagnetic radiation beam. The third particle or electromagnetic radiation beam illuminates the detector in a third direction and generates a third plurality of sensor signals, wherein the third direction is orthogonal to the first and second directions. This embodiment further comprises detecting the third plurality of sensor signals and generating a third dataset, wherein the third dataset comprises data corresponding to positions where the third particle or electromagnetic radiation beam interacts with the detector. The positional data are then identified that are common to the first, second and third datasets, and a mean detector response function (MDRF) for the detector is generated from the common positional data subsets. By utilizing three sets of particle or electromagnetic radiation beams where at least one of the beams is in an orthogonal or not co-planar direction (such as in the X, Y and Z directions), the generated MDRF is a three-dimensional function capable of calibration for DOI estimation. In an embodiment, the sensor signals are induced by scintillation photons.

This invention solves long-standing challenges in the calibration of detectors used in medical imaging devices and is also useful for security screenings and other imaging photon counting detectors. The present method is simple to use, requires less time than conventional calibration methods, and is easy to implement, while also pushing the current state of the art into additional applications. Existing calibration techniques have been a hindrance to wide-spread adoption of photon counting systems and this method is broadly application while being simple and robust.

BRIEF DESCRIPTION OF THE DRAWINGS

In FIG. 3, panel a, two perpendicular fan beams are used to scan a detector, where one beam scans in horizontal direction and the other beam scans in the vertical direction. The reference events at each scanning step are recorded. In FIG. 3, panel b, the gamma-ray beams are modified to provide defined illuminated regions having predetermined shapes which intersect one another other than intersecting lines.

DETAILED DESCRIPTION OF THE INVENTION

Currently existing methods used to calibrate gamma-ray and photon counting detectors provide insufficient coverage or come with significant disadvantages, such as being very time consuming or being unable to calibrate depth of interaction information. A brief description of conventional calibration methods are described below.

Figure 2:
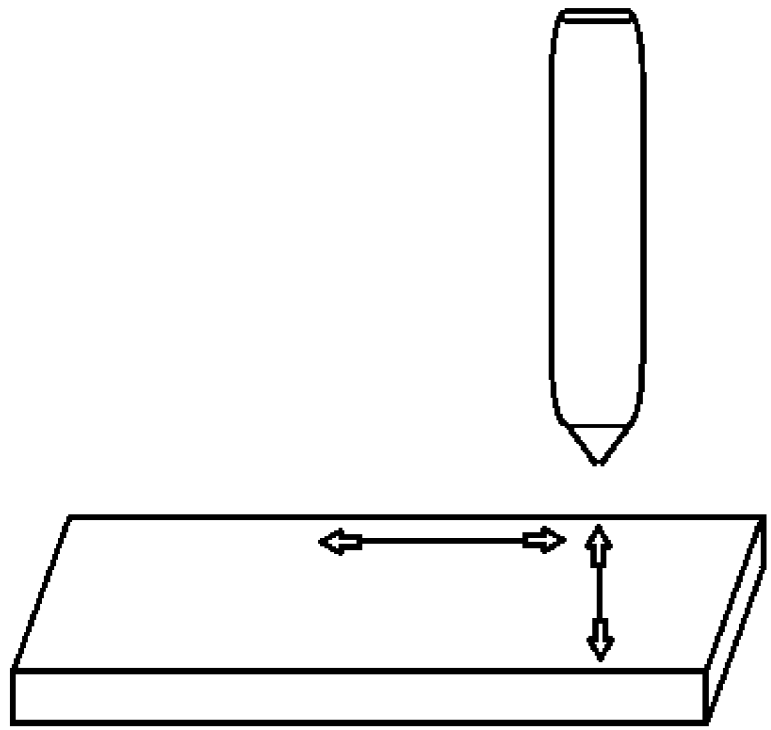
FIG. 2 shows an illustration of a conventional MDRF calibration system of a camera, such as used in the Fast-SPECT II system in the Center for Gamma-ray Imaging.

Method 1: Scanning the detector surface with a thin collimated gamma-ray beam. This method uses a physical collimator, a radioactive source at the end of a long narrow hole drilled through a gamma-ray-absorbing material such as lead or tungsten, to produce a well-collimated thin beam of gamma rays that can be oriented perpendicular to the detector surface (Chen, et al., 2005, "*Calibration of Scintillation Cameras and Pinhole SPECT Imaging Systems*," Chapter 12 in Small-Animal SPECT Imaging, M. A. Kupinski and H. H. Barrett (Eds.) Springer Science and Business Media, pp. 195-201, 2005). This method then uses an XY-stage system to scan across the whole detector area while recording the calibration events at each scanning location (see FIG. 2) in a computer file.

The advantages for this method are that it is conceptually simple and straight forward to implement. However, this method is very time-consuming since gamma-ray sources emit photons in all directions ($4\pi$ solid angle). Additionally, collimating the source to a thin beam has extremely low efficiency. Thus, the count rate is relatively low and for a large detector a very large number of locations on the detector face need to be measured.

It is also very difficult to calibrate depth of interaction information, since at each location, the light sensors' mean response is calculated by sampling all the gamma-ray interactions along the path of the beam. That is, the data is generated along a line through the crystal, not at a single point inside the crystal. Accordingly, it is very difficult to obtain 3D calibration data.

Method 2: Scanning the detector with a grid of thin collimated gamma-ray beams. This method is similar to method 1, but is able reduce the calibration time by N times, where N is the number of thin collimated beams (Jeong et al., 2003, "*Position mapping, energy calibration, and flood correction improve the performances of small gamma camera using PSPMT*," In Nuclear Science Symposium Conference Record, 2003 IEEE(Vol. 3, pp. 2103-2107). In other words, multiple thin collimated beams arranged in a grid system are utilized simultaneously. However, it is still very difficult to calibrate the depth of interaction information. Additionally, a complicated multi-bore collimator must be used generate a grid of gamma-ray beams, which means extra cost, size, and weight.

Method 3: Simulate the MDRFs by carefully modeling all of the detector and scintillation photons' processes inside the detector. This method relies on simulation to produce the detector's response functions (Li, et al., 2010, "*Nonlinear least-squares modeling of 3D interaction position in a monolithic scintillator block*," Physics in medicine and biology, 55(21): 6515). Such simulations are not a problem for modern computers, however, since a lot of information cannot be predicted by simulation such as minor imperfections in the crystal material or surface treatments, variations between light sensors, and manufacturing tolerances, the accuracy of this approach is limited.

The advantages of this method include the fact that the simulations can be performed using standard computers and programs incorporating known formulas and physics. Additionally, depth of interaction responses can also be predicted. However, it can be very difficult to simulate any real, individual detector accurately. Such modeling is also not strictly a calibration method.

Method 4: Calibrate the detector with an un-collimated source. This is a published approach that has not been fully verified (España et al., 2013, "*Fast calibration of SPECT monolithic scintillation detectors using un-collimated sources*," Physics in medicine and biology, 58(14):4807). This method uses a so-called self-organizing map that can be understood as using an initial guess of MDRFs to estimate the position of each event, then using the estimated events' positions together with their signal vectors to generate a new set of MDRFs (while using neighborhood function to smooth the new MDRFs), and iterating over and over again while shrinking the neighborhood function size until convergence. Distortion correction is required to make the flood image uniform.

While this method can be extremely efficient to measure the calibration set, the data processing process is complicated, prior information or guesses are required, and iterations to recover MDRFs can get stuck in local metastable states. This method also has a fundamental problem in that there is not a unique coordinate system to describe. Instead, the coordinate system for the events must be imposed in post processing. Additionally, the ability to calibrate complicated detector geometries (edge-readout detector with optical barriers) is unclear, especially where there is a sudden change in the features of the MDRFs. The algorithm used in this method assumes that the MDRF is smooth and only changes gradually with position. This method is also unable to calibrate depth of interaction information.

Method 5: Fan beam calibration while using k nearest neighbor to estimate interaction position. In this method, a fan beam created with a source and slit is used to scan the detector in the direction orthogonal to the slit orientation (Borghi et al., 2015, "*Experimental Validation of an Efficient Fan-Beam Calibration Procedure for k-Nearest Neighbor Position Estimation in Monolithic Scintillator Detectors*," IEEE Transactions on Nuclear Science, 62(1): 57-67). At each scanning step, all the reference events are collected to form a reference data set. For example, if there are 20 scanning positions in one dimension, there will be 20 reference data sets in that dimension, each data set contains many thousands of reference events. A new event's position in that dimension is estimated by comparing the event's signal vector with all the reference data sets at different calibration locations. By finding the k nearest neighbors (k events with minimum Euclidean distance in data space to the unknown event for example), the unknown event's location can be estimated by majority voting among the k nearest neighbors' calibration positions (or average of the k nearest neighbors' calibration positions). Separate fan-beam measurements are used to calibrate and estimate X and Y locations.

The calibration time is greatly reduced as fan beams are used; however, the calibration data sets are large, with a dimensionality given by the number of light sensors, which makes it challenging to process data in real time.

In view of the above, an improved method for calibrating gamma-ray and photon counting detectors is highly desirable.

Overview

The present invention utilizes measurements of particle beams or electromagnetic radiation beams on a detector to find data subsets of two or more intersecting calibration datasets in order to calibrate the detector, better estimate the position of each interaction event in the detector, and provide enhanced images.

Figure 1:
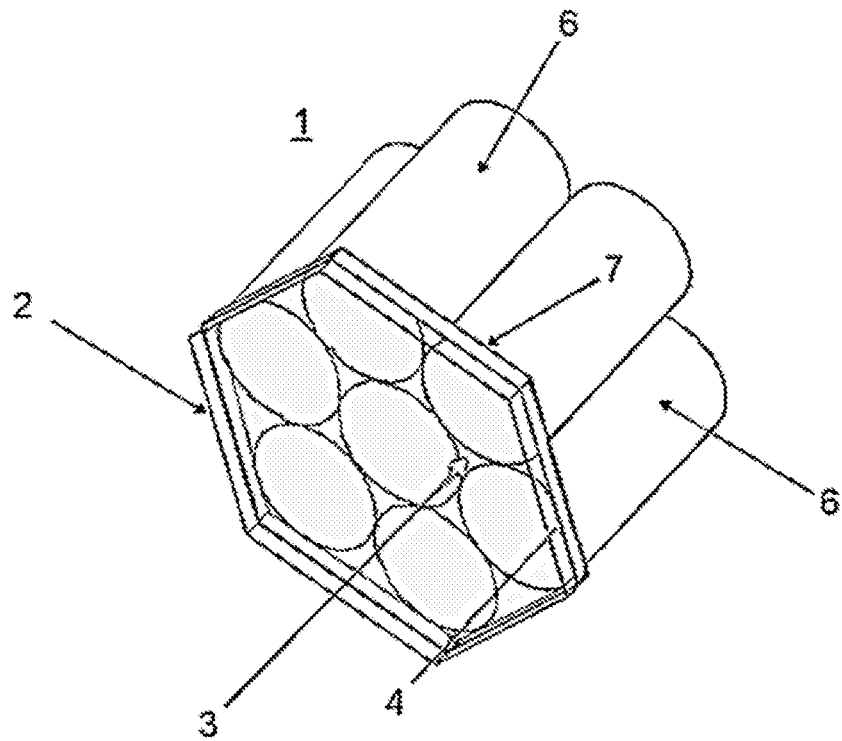
FIG. 1 illustrates a basic geometrical configuration of a conventional monolithic crystal detector (panel a), and a schematic of a system able to calibrate such a detector according to the present invention (panel b).
Figure 1:
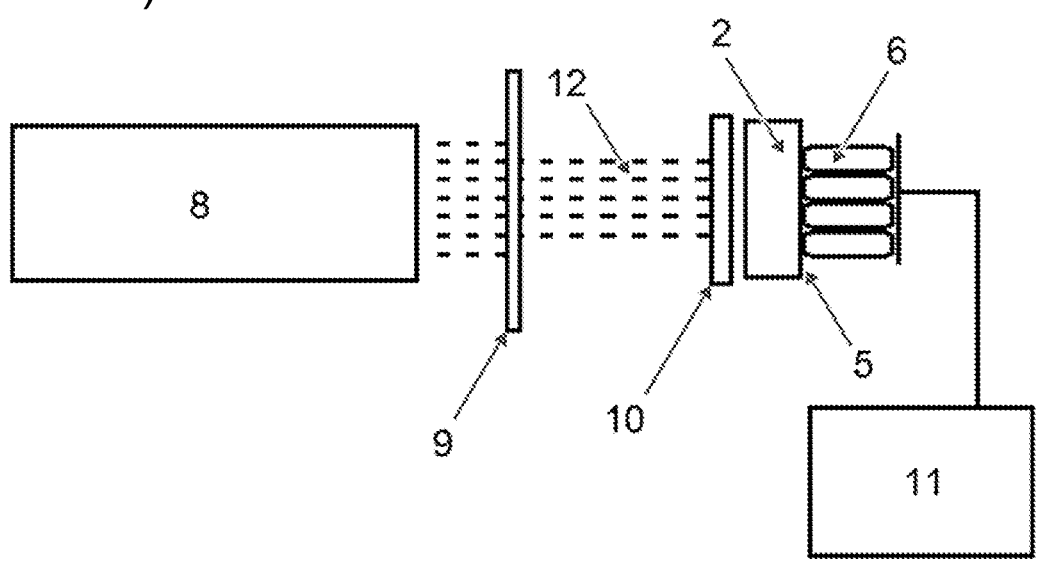

FIG. 1 shows a basic configuration of a typical scintillation crystal detector and a system able to calibrate such a detector. As seen in FIG. 1, panel a, the detector (1) comprises a scintillation crystal (2) having a front surface (3), a back surface (5) (shown in panel b), and one or more edge surfaces (4). The scintillation crystal is able to generate scintillation photons in response to being illuminated by a particle or electromagnetic radiation beam (12). The detector (1) further comprises one or more photodetectors (6) able to receive generated scintillation photons exiting the scintillator crystal (2) and able to generate electrical signals in response to the received photons. The electrical signals are transmitted to a microprocessor (11), which generates data sets corresponding to the positions of the interaction events between the particle or electromagnetic radiation beam (12) and the scintillator crystal (2). The detector (1) may further comprise a light guide (7) able to transmit scintillation photons exiting the scintillator crystal (2) to the one or more photodetectors (6).

Figure 12:
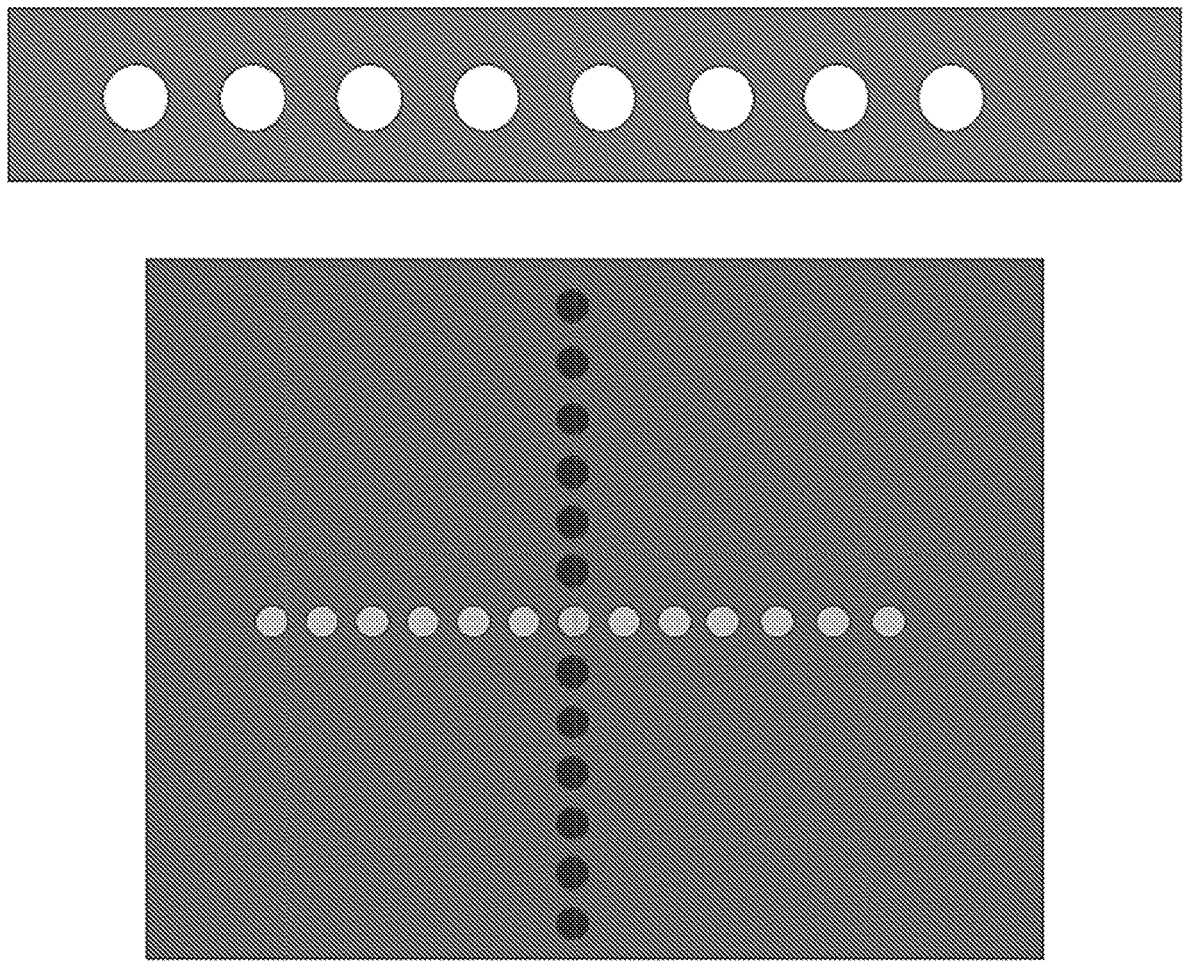
FIG. 12 illustrates a mask in an embodiment of the invention able to be positioned over the detector, wherein the mask blocks one or more portions of the beams from illuminating the detector. As shown in the top panel, the mask comprises a series of holes. The resulting beam illuminating the detector surface will not form a continuous illuminating beam, but instead will form a series of discrete dots on the detector (bottom panel).

The system comprises a means for illuminating selected regions of the front detector surface with a particle or electromagnetic radiation beam (12). As shown in FIG. 1, panel b, the means for illumination comprises a particle source or electromagnetic radiation source (8) and a slit (9) able to able to shape the particle or electromagnetic radiation beam into a desired shape. Optionally, the system comprises a mask (10) instead of the slit, where the mask (10) is able to be positioned over the detector in order to form a desired illumination pattern on the detector surface (see also FIG. 12). While FIG. 1, panel b, shows both a slit (9) and a mask (10), typically only one of these items will be present. As shown in FIG. 12 (top panel), the mask comprises a series of holes. The resulting beam illuminating the detector surface will not form a continuous illuminating beam, but instead will form a series of discrete dots on the detector (bottom panel). The common data subset between the two beams is found in the two strings of discrete dots on the detector. This will help to reduce side lopes (i.e., will provide sharper data sets) and allow the common data subset to be estimated more precisely.

During operation, a first beam is used to illuminate the detector in a specified region or direction across the detector. A second beam is then used to illuminate the detector in a second specified region or a second direction across the detector. Optionally, one or more additional beams are also used to illuminate the detector in additional regions. In an embodiment, the beams are not administered simultaneously, and instead are administered at separate times from one another. The data generated from each beam is collected and common data subsets are generated for regions where two or beams intersect one another. The common data subsets are then used to generate mean detector response functions (MDRFs) which are used to calibrate the detector and enhance images generated using the detectors. As used herein, "common data subsets" generally refers to data subsets taken from intersecting regions in the detector. For example, data vectors in high dimensional space that are similar according to measuring metrics known in the art.

Figure 3:
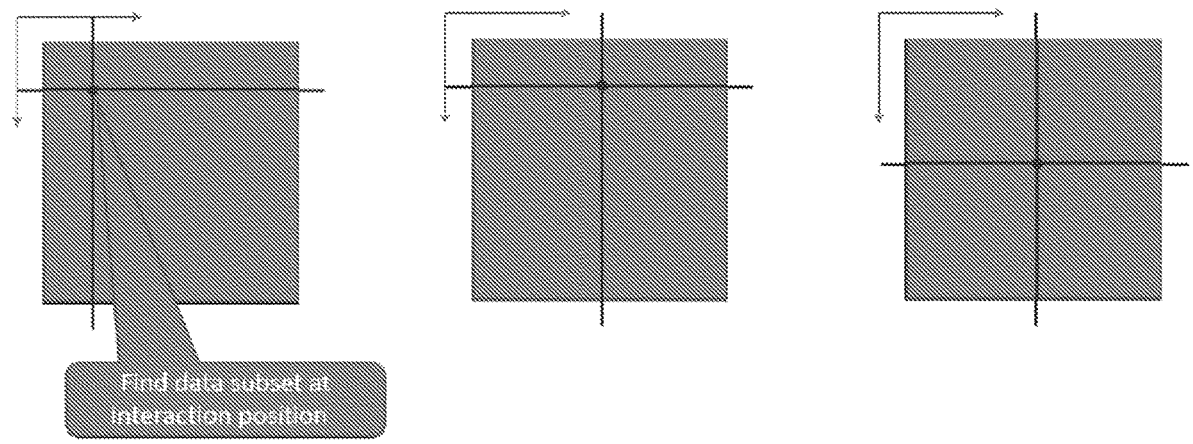
FIG. 3 illustrates the process of a 2D calibration in different embodiments of the present invention.
Figure 3:
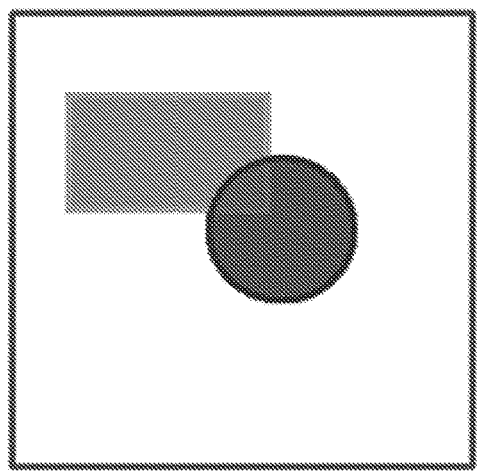

FIG. 3, panel a, shows one embodiment of the present invention (a 2D calibration) where two perpendicular fan beams are used to scan the detector. One beam scans in the horizontal direction, while the other beam scans in the vertical direction. The reference events at each scanning step are recorded.

For example, $A_i$ represents one of the horizontal scanning datasets at step i, while $B_j$ represents one of the vertical scanning datasets at step j. If the data subset $C_{ij}$ is found at the intersection of these two datasets, the detector's response at location (i, j) is obtained by averaging the light sensors' signals in $C_{ij}$. Using other different combinations of datasets at different locations, the whole detector's mean response is obtained over the whole detector area, namely, the MDRFs. The fundamental observation is that only the events occurring in the volume of the detector that is common to both measurements generate similar data. Thus, a sort to find the common data in the two lists synthesizes what would have been measured by a collimated beam that probes that same volume.

FIG. 3, panel a, shows an embodiment where the beams are restricted to illuminate linear regions in the vertical and horizontal directions. However, the shape of the beam may be modified to provide intersecting illuminated regions having predetermined shapes other than intersecting lines (panel b) when used with proper data processing methods.

Figure 4:
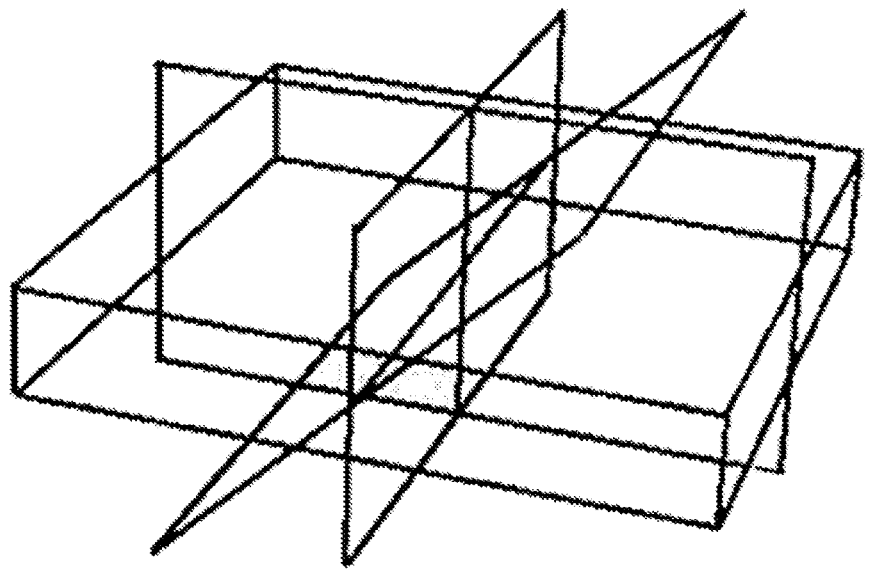
FIG. 4 illustrates the process of a 3D calibration in one embodiment of the present invention. Three fan beams are used to find the common data subset among three datasets, that is, the interaction events at the point of the intersection position of the three fan beams.
Figure 4:
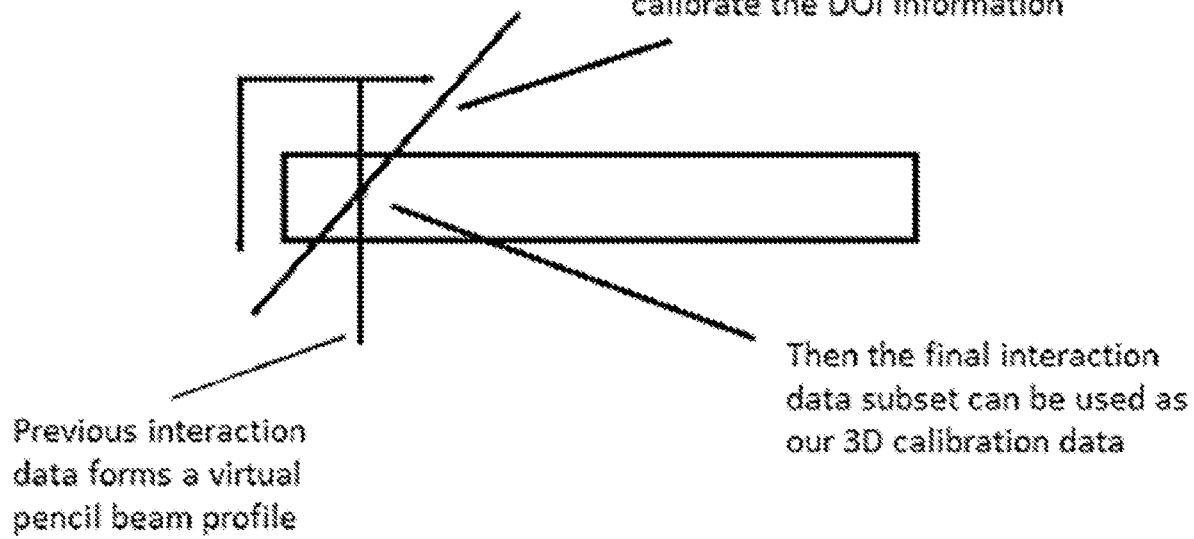

For 3D detector designs, another scan with a slanted fan beam can be carried out to calibrate the depth of interaction (DOI) information by finding the data that is common to three measurements. This is illustrated in FIG. 4, where three fan beams are used to find the common data subset among these three datasets, for example, the gamma-ray events that interacted at the point of the intersection position of the three fan beams.

A benefit of the present method is that, by using 2N fan-beam scans (N scans in X and N in Y), the detector can be calibrated instead of using traditional $N^2$ scans for 2D collimated-beam case. For 3D applications, 3N scans are enough, and capable of calibration for DOI estimation.

EXAMPLES

Example 1—How to find the common data subsets. Two or more events that interact at the same or nearly the same location inside a detector's scintillation crystal will have similar signal responses of the light sensors. That is, two events that interacted in close proximity inside the scintillator crystal (object space) will also be in close proximity in the signal (data) space. If, for example, there are 20 light sensors, the dimension of the data space is 20. Thus, the object is to find the intersection:

$C = A \cap B$.

While numerous methods can be used to find the common data subset, one non-limiting method is presented below as an example:

Let $A_x = \{a_0, a_1, a_2, \ldots, a_{m-1}\}$ be one of the datasets collected from a fan beam scanning the X direction that has m events.

Let $B_y = \{b_0, b_1, b_2, \ldots, b_{n-1}\}$ be one of the datasets collected from a fan beam scanning the Y direction that has n events.

In accordance with equation (1):

$$\text{score}(a\_i) = \sum_{j=0}^{n-1} \left( \sum_{k=0}^{K-1} (|a\_i(k) - b\_j(k)|)^p + r \right)^{-1} \quad (1)$$

the score (merit field value) of event $a_i$ is the score of this unknown event tested against data set $B_y$ (or can be thought of as sampling the merit field generated by dataset B with an event from dataset A–$a_i$). All of the events in data set $A_x$ are sorted in descending order according to their scores. Then the p events with the highest scores are categorized as part of the events in the overlapped region of the two data sets. The other part is found in data set $B_y$ using the same procedure. p is the estimated number of beam interactions in the overlap region of data set $A_x$ and $B_y$. This can be quite timing consuming to compute; however, if necessary, GPUs (or other computer processors) can be used to calculate the scores while the CPU is in charge of sorting the scores. This procedure is only required to be executed once as part of a camera calibration procedure.

Example 3—Simulation. A simulation was performed using an edge readout detector configuration as described in international application PCT/US2017/058501 (5×5 SiPMs, with 50.4 mm×50.4 mm×3 mm LYSO crystal).

Figure 5:
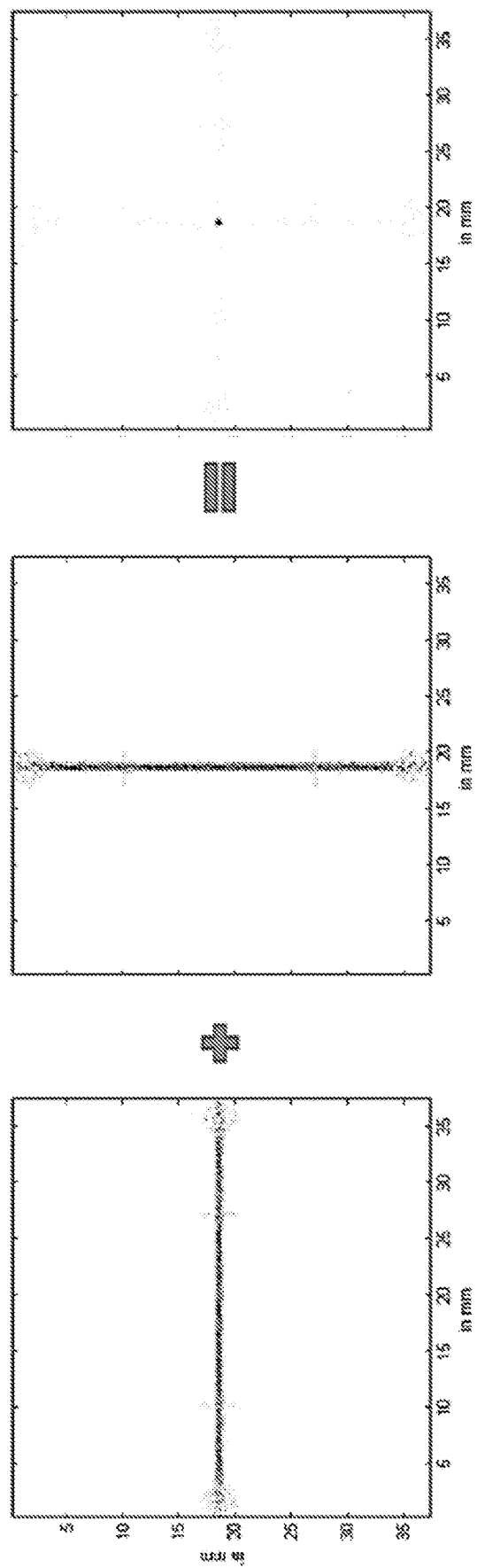
FIG. 5 shows an example of calculating the common data subset of data sets from two perpendicular slit beams in one simulation.

The common data set from two slit data sets calculated using the above configuration with the above equation (1) is shown in FIG. 5. The positions were estimated by maximum likelihood estimation.

Another simulation was performed with the following parameters:

10 X-direction fan beam datasets were simulated with step size of 5 mm.

10 Y-direction fan beam datasets were simulated with step size of 5 mm.

Beam size is 0.45 mm FWHM, 50k events for each scanned position.

Then use pencil beam of 0.45×0.45 mm FWHM to generate 10×10 positions for comparison, 1000 events for each scanned position.

Figure 6:
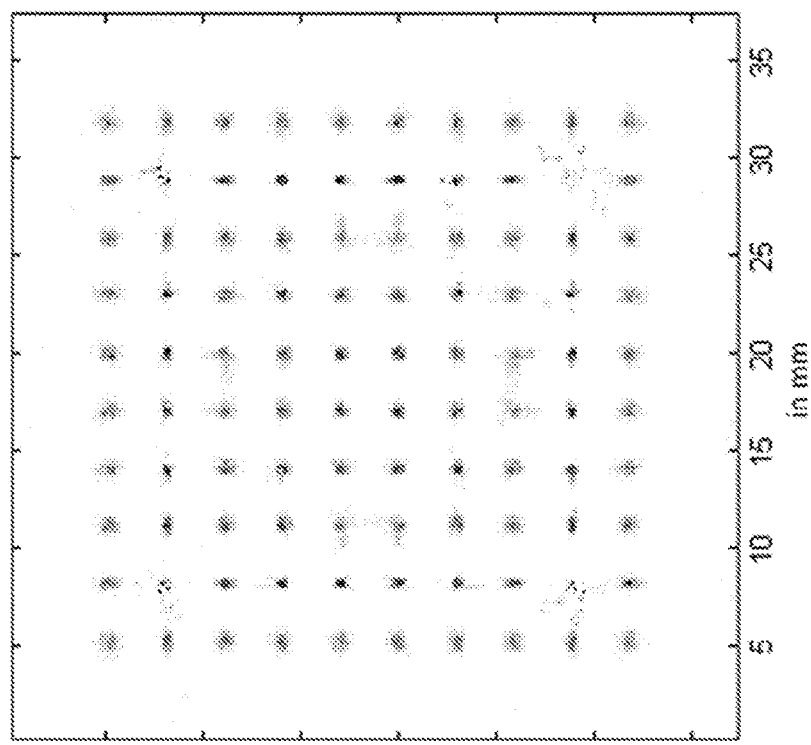
FIG. 6 shows the estimated position of histogram events. Left: position histogram of events scanned using a thin gamma-ray beam. Right: position histogram of events generated using two sets of orthogonal scans of slit beams as described in an embodiment of the present invention. These histograms are generated by maximum likelihood estimation.
Figure 6:
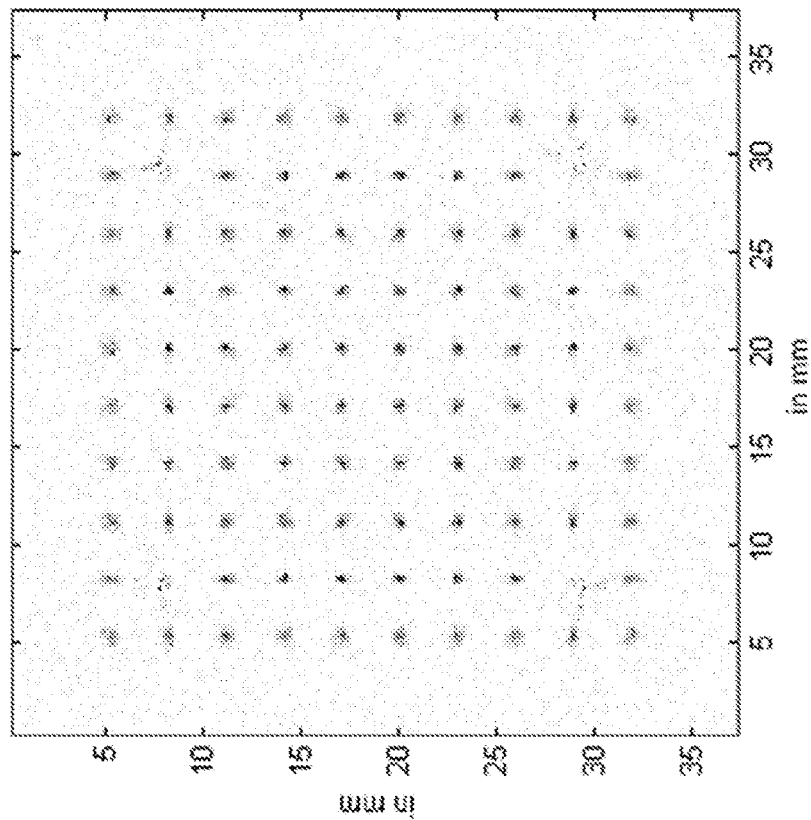

The above equation (1) was used to get the intersection at 10×10 locations, their positions were estimated by maximum likelihood estimations and compared with thin beam scans in FIG. 6.

Figure 7:
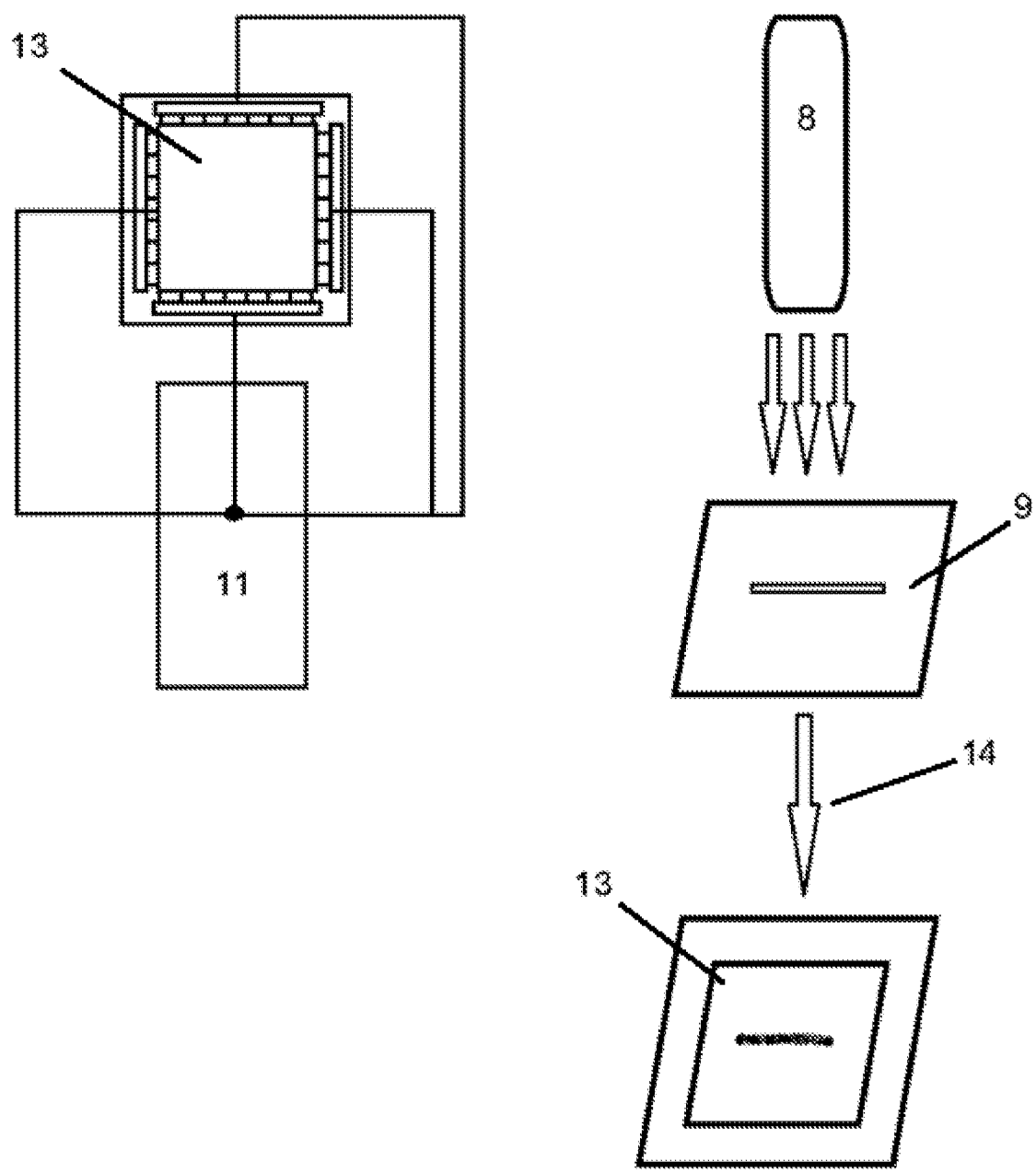
FIG. 7 shows a schematic of an edge readout detector and slit aperture used in calibration experiments. Left: an edge readout detector and corresponding readout electronics. Right: a slit aperture used to collimate gamma photons and the calibration stages.

Example 4—Experiment. An edge readout detector (shown in FIG. 7) was used to verify this method with a slit beam of 662 keV gamma-ray photons using $^{137}$Cs. As generally illustrated in FIG. 7, photons from an electromagnetic source 8 were passed through a slit 9 to form a slit beam 14 that illuminates a narrow region of the edge readout detector 13, which transmits corresponding electrical signals to a microprocessor 11 or readout electronics. In this instance, the edge readout detector was used with 16 Hamamatsu S13360-6050PE MPPCs, and one piece of CsI(TI) of dimension 27.4mm×27.4mm×3mm.

Figure 8:
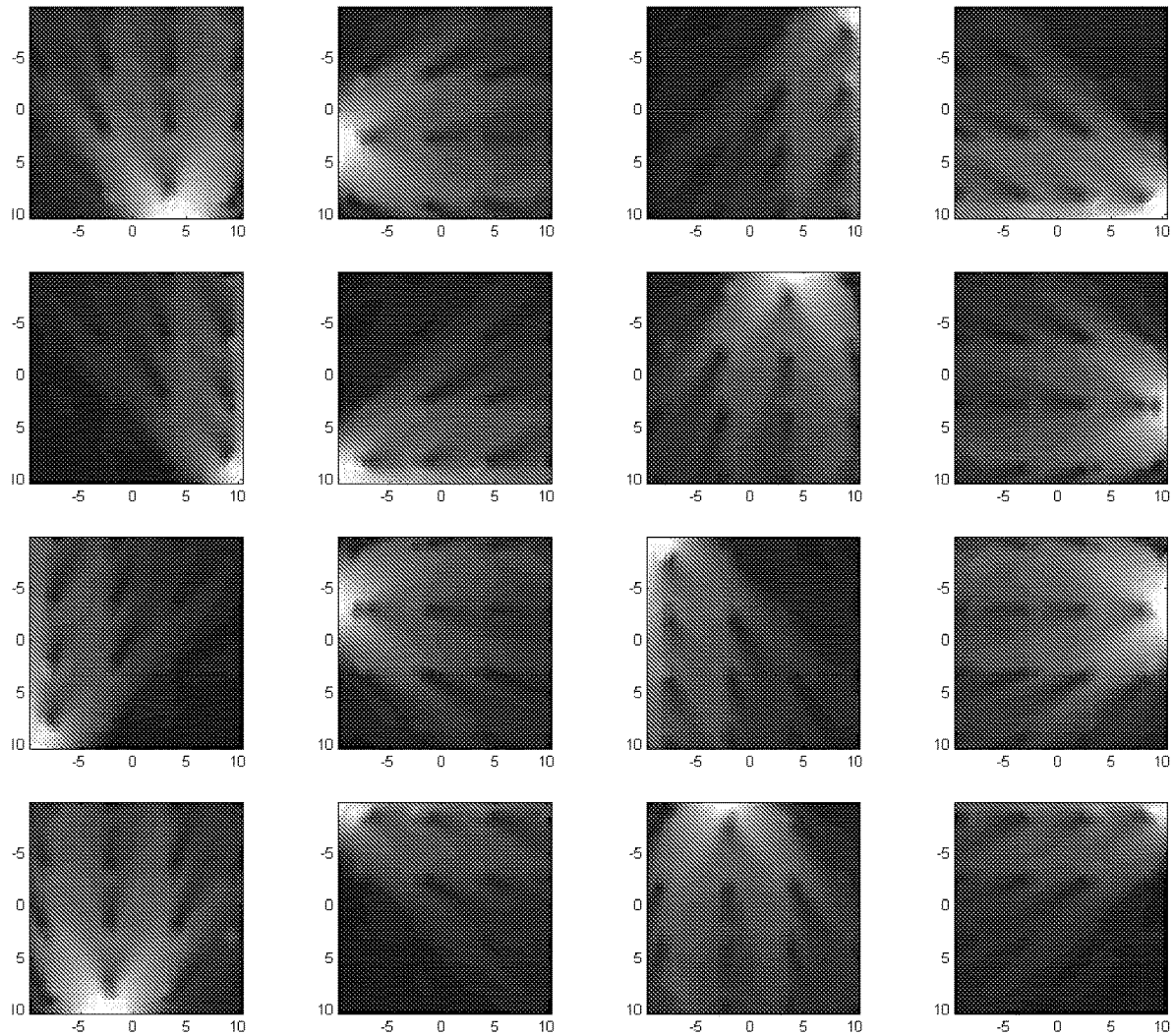
FIG. 8 shows MDRFs calculated from a common data subset method in on experiment. The units are mm.

The scans were performed at 81 locations in both X and Y directions, with a step size of 0.25 mm. The width of the slit beam at the detector surface was measured to be 0.62 mm FWHM. After the measurements, the above equation (1) was used to calculate the common data subset at different locations on the detection surface. Before calculating the MDRFs, a median filter was applied in the signal space to filter out outliers. Then the MDRFs were calculated using residual events after the filtration. The resulting MDRFs are shown in FIG. 8.

Figure 9:
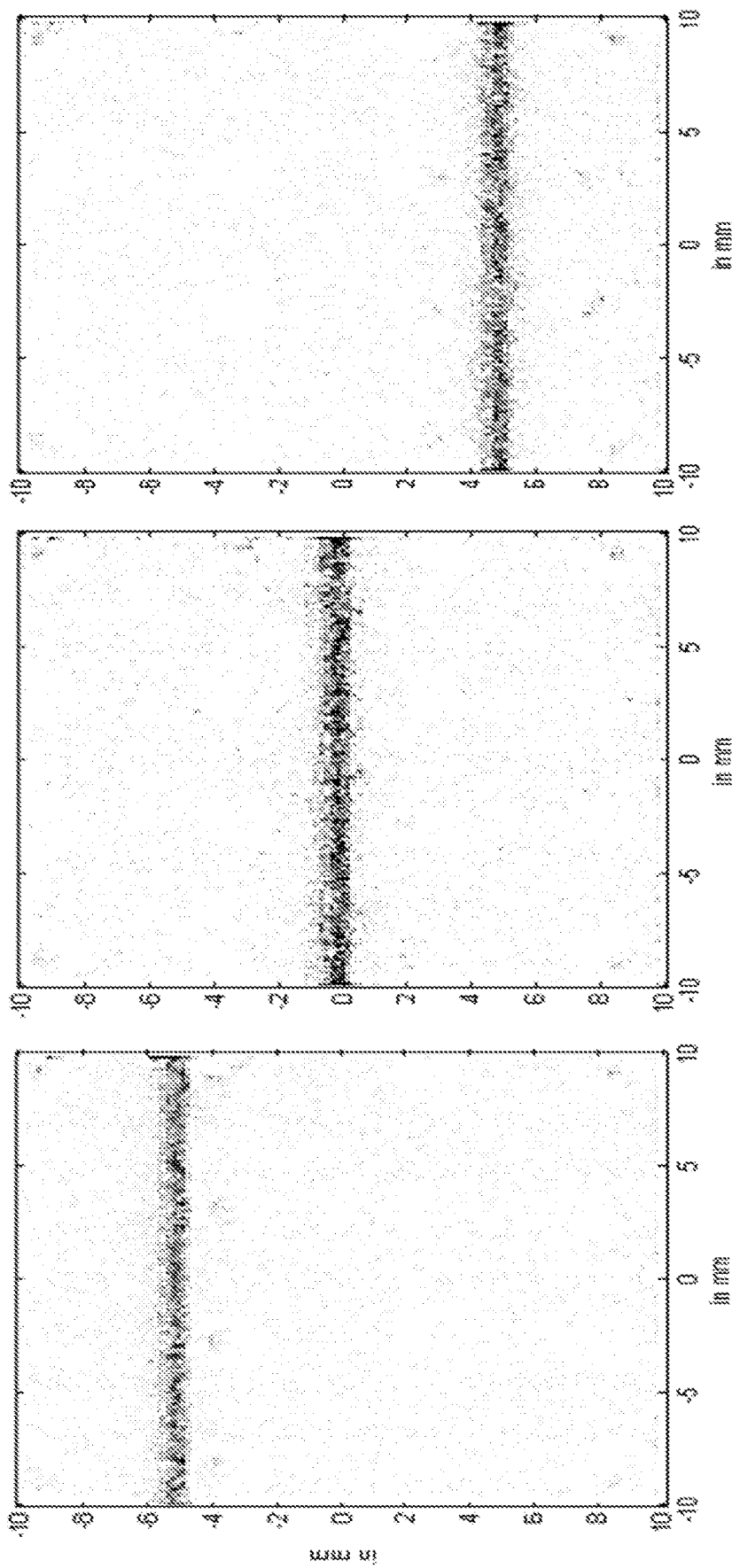
FIG. 9 shows fan beam projections on a detector used to test the MDRFs calculated from the common set method shown in FIG. 8.

After calculating the MDRFs, images acquired using the same slit beam were used to analyze this method's performance. The beam was translated to 3 locations (−5 mm, 0 mm, 5 mm). The results are shown in FIG. 9.

Figure 10:
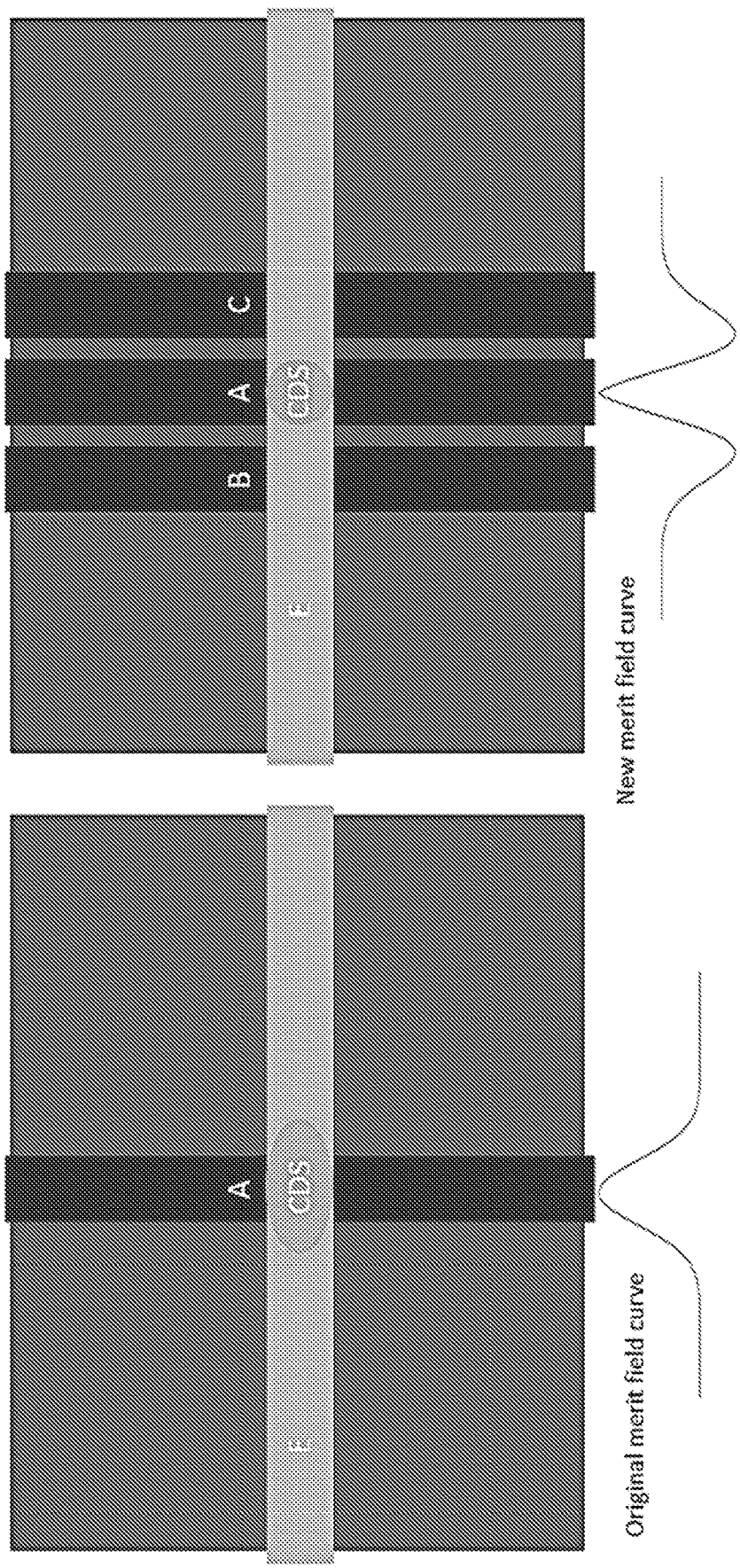
FIG. 10 illustrates how a merit field value of a common data subset between two intersecting beams can be calculated more accurately using datasets from adjacent beams.

Example 6—Using adjacent datasets to calculate merit field value. As illustrated in FIG. 10, a merit field value or score of a common data subset (CDS) between two intersecting beams (E and A) can be calculated more accurately using datasets from adjacent beams (B and C). By identifying that a data point from a certain position corresponds to beam B or C, that position can be eliminated as corresponding to beam A. In other words, a more sharply defined common data subset can be calculated by using data from beams that illuminated regions adjacent to the intersecting beams.

A merit field value can be described where event $\vec{e}$ is a data vector (signal vector), which indicates a position in the high dimensional space, and data points in dataset A extend a field in high dimensional space merit($\vec{s}$, A), whose value at position $\vec{e}$ is merit($\vec{e}$, A), which indicates how close event $\vec{e}$ is relative to dataset A.

Thus, the merit field extended by dataset A merit($\vec{s}$, A) can have various definitions, for example:

$$\text{merit}(\vec{s}, A) = \sum_{\vec{a_i} \in A} (|\vec{s} - \vec{a_i}|^p + r)^{-1},$$

where p is a real number and r is a small positive number;

$$\text{merit}(\vec{s}, A) = \sum_{\vec{a_i} \in A} e^{-\frac{|\vec{s}-\vec{a_i}|^p}{r}},$$

where p is a real number and r is a positive number; and $$\text{merit}(\vec{s}, A) = \max\left(e^{-\frac{|\vec{s}-\vec{a_1}|^p}{r}}, e^{-\frac{|\vec{s}-\vec{a_2}|^p}{r}}, \ldots, e^{-\frac{|\vec{s}-\vec{a_N}|^p}{r}}\right)$$

for where p is a real number and r is a positive number, and $A=\{\vec{a_1}, \vec{a_2}, \ldots, \vec{a_N}\}$.

While the merit field of a dataset A definition can vary, each definition is able to reflect if an event $\vec{e}$ is close to A or not. A merit field curve generated by a common data subset obtained from the intersection of beam E and beam A alone results in a gradually sloping peak (FIG. 10, left). The merit field value of event $\vec{e}$ in dataset E tested by dataset A is: merit($\vec{e}$, A).

However, if datasets from adjacent beams are utilized. The new merit field value can be defined as: merit$_{new}$($\vec{e}$, A,B,C)=merit($\vec{e}$, A)−max(merit($\vec{e}$, B), merit($\vec{e}$, C)). This reduces the side lopes of the peak (i.e., makes the peak narrower and sharper) so the common data subset between A and E is estimated more accurately.

Figure 11:
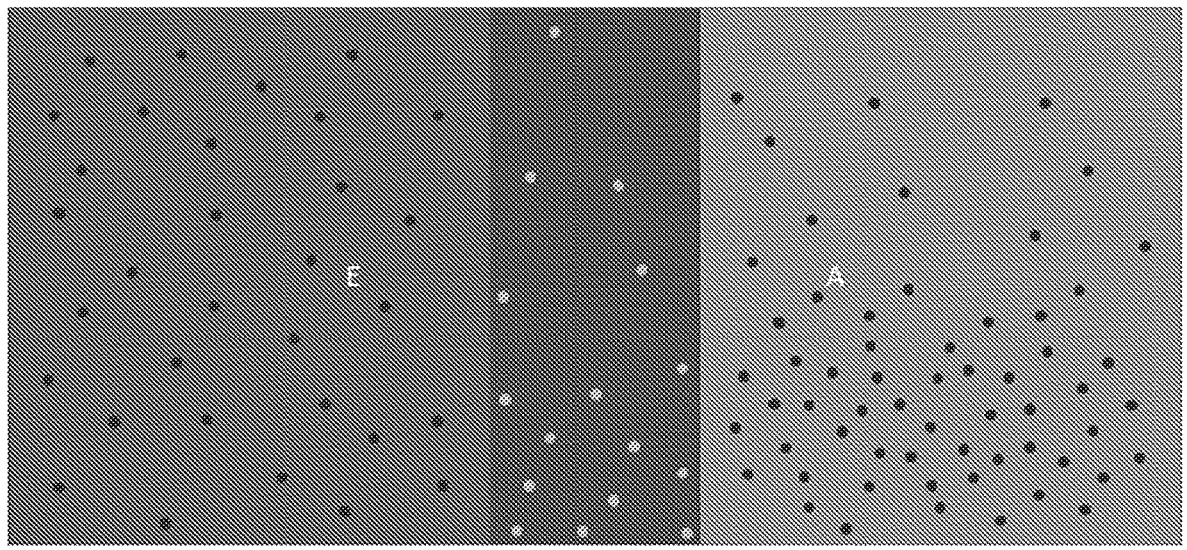
FIG. 11 illustrates how a dataset in multi-dimensional space from one beam may be uniform (E), while a dataset from another beam (A) might not be uniform. The common data subset of E achieved from the intersection of beam A and E in this instance will also not be uniform, potentially resulting in bias error. In order to eliminate the bias in the merit field due to data density difference, some pre-processing of the dataset may be necessary to balance the merit field of dataset A.

Example 7—Pre-processing data. As illustrated in FIG. 11, a dataset in multi-dimensional space from one beam may be uniform (left), while a dataset from another beam (right) might not be uniform. As a result, the common data subset from dataset E (middle) will also not be uniform, potentially resulting in bias error.

More specifically, data points in E are uniform in signal space, but data points in A are not uniform. Therefore, the common data subset achieved from E (subset of E) is also not uniform, because the merit field extended by the data points in A, merit($\vec{s}$, A), have higher value in the lower part of A, which "attracts" more points from E in the lower part to be selected, which creates bias error.

In order to eliminate the bias error the data may be pre-processed. The data pre-processing of dataset A is to make the merit field, merit($\vec{s}$, A), more flat in the signal domain so that the bias error is minimized. For example, if $$merit(\vec{s}, A) = \sum_{\vec{a}_i \in A} c_i e^{-\frac{|\vec{s}-\vec{a}_i|^p}{r_i}},$$

$c_i$ and $r_i$ can be adjusted to flatten the merit field.

Pre-processing methods able to adjust the merit field include but not limited to: creating artificial data points in the lower merit field region (also referred to as "Bootstrapping"); randomly deleting data points in the higher merit field region; giving more weight to data points in the lower density region to balance the merit field (adjusting $c_i$ the above example); and adjusting the decay of each event (adjusting $r_i$ in the above example).

Example 8—Conclusion. The methods exemplified above are capable of synthesizing MDRFs that would normally require time-consuming 2D scans with finely collimated beams by using a small number of efficient fan beam measurements to calibrate the monolithic crystal detector. This saves calibration time, making it possible to implement on even the largest gamma or X-ray cameras such as those used in clinical setting.

More importantly, these methods have potential to calibrate in 3D, allowing DOI estimation that could not be achieved easily with any other methods. Since monolithic crystal detectors in combination with advanced position estimation methods (such as MLE) has been hindered by the absence of a reliable, fast and easy method to calibrate the detector, this is potentially a very valuable development. With the calibration methods described herein, monolithic detector MDRFs can be calibrated quickly and precisely all the way out to camera edges, which means that monolithic crystal detectors with maximum likelihood position estimation could be made smaller relative to existing Anger-arithmetic designs and still achieve the same effective image size. As such, the present methods would be of great impact in clinical systems.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A method for calibrating a particle or electromagnetic radiation detector comprising the steps of:
    a) illuminating the detector with a first particle or electromagnetic radiation beam, wherein the first particle or electromagnetic radiation beam illuminates the detector in a first defined region in the detector and generates a first plurality of sensor signals;
    b) detecting the first plurality of sensor signals and generating a first dataset, wherein the first dataset comprises data corresponding to positions where the first particle or electromagnetic radiation beam interacts with the detector;
    c) illuminating the detector with a second particle or electromagnetic radiation beam, wherein the second particle or electromagnetic radiation beam illuminates the detector in a second defined region in the detector and generates a second plurality of sensor signals, wherein the second region intersects the first region and wherein the first region and second region are different;
    d) detecting the second plurality of sensor signals and generating a second dataset, wherein the second dataset comprises data corresponding to positions where the second particle or electromagnetic radiation beam interacts with the detector;
    e) identifying positional data subsets that are common to both the first and second datasets;
    f) generating a reference dataset for the detector from the common positional data subsets.

2. The method of claim 1 comprising generating a mean detector response function (MDRF) for the detector from the common positional data subsets.

3. The method of claim 1 wherein the first region and second region are co-planar.

4. The method of claim 1 wherein the particle or electromagnetic radiation beams are fan beams.

5. The method of claim 1 further comprising the steps of:
illuminating the detector with a third particle or electromagnetic radiation beam, wherein the third particle or electromagnetic radiation beam illuminates the detector in a third defined region and generates a third plurality of sensor signals, wherein the third region intersects the first and second regions;
detecting the third plurality of sensor signals and generating a third dataset, wherein the third dataset comprises data corresponding to positions where the third particle or electromagnetic radiation beam interacts with the detector;
identifying positional data subsets that are common to the first, second and third datasets; and
generating a MDRF for the detector from the common positional data subsets.

6. The method of claim 5 wherein the first region is in a first plane and the third region is in a second plane which is orthogonal to the first plane.

7. The method of claim 5 wherein the first region is in a first plane and the third region is in a second plane which is oriented at an angle between 15 to 75 degrees to the first plane.

8. The method of claim 5 wherein the generated MDRF is a three-dimensional MDRF.

9. The method of claim 5 further comprising the steps of:
illuminating the detector with one or more additional particle or electromagnetic radiation beams, wherein each of the one or more additional particle or electromagnetic radiation beams illuminates the detector in an additional defined region and generates an additional plurality of sensor signals, wherein each additional region intersects the first region and is a different region in the detector than a region illuminated by another particle or electromagnetic radiation beam;
detecting the additional plurality of sensor signals and generating an additional dataset for each of the one or more additional particle or electromagnetic radiation beams, wherein each of the additional datasets comprises data corresponding to positions where the additional one or more particle or electromagnetic radiation beams interact with the detector;
identifying positional data subsets that are common to all of the particle or electromagnetic radiation beams illuminating the detector; and
generating a mean detector response function (MDRF) for the detector from the common positional data subsets.

10. The method of claim 9 wherein the first region is in a first plane and each additional region illuminated by the one or more additional particle or electromagnetic radiation beams is in an additional plane which is oriented at an angle between 0 to 90 degrees to the first plane.

11. The method of claim 1 further comprising performing an imaging scan utilizing the detector, estimating the position of each interaction event within the detector, and generating, enhancing and/or adjusting an image based on the generated reference dataset or MDRF.

12. A system for detecting a particle or electromagnetic radiation, said system comprising:

a) at least one particle or electromagnetic radiation detector comprising: (i) at least one scintillator crystal having a front surface, a back surface, and one or more edge surfaces, wherein said scintillator crystal is able to generate scintillation photons in response to an interaction event between a portion of the scintillator crystal and said particle or electromagnetic radiation, and (ii) one or more photodetectors in optical communication with the at least one scintillator crystal, said one or more photodetectors able to receive generated scintillation photons exiting the at least one scintillator crystal and generate electrical signals in response to said received photons;
b) means for illuminating selected regions of the at least one particle or electromagnetic radiation detector with a particle or electromagnetic radiation beam; and
c) a microprocessor configured to receive electrical signals generated by the one or more photodetectors and generate data corresponding to positions of the interaction events between the particle or electromagnetic radiation beam and the scintillator crystal, wherein said microprocessor is further configured to:
(i) illuminate the at least one particle or electromagnetic radiation detector with a first particle or electromagnetic radiation beam in a first defined region in the at least one particle or electromagnetic radiation detector, and generate a first dataset, wherein the first dataset comprises data corresponding to positions where the first particle or electromagnetic radiation beam interacts with the at least one particle or electromagnetic radiation detector;
(ii) illuminate the at least one particle or electromagnetic radiation detector with a second particle or electromagnetic radiation beam in a second defined region in the at least one particle or electromagnetic radiation detector, and generate a second dataset, wherein the second dataset comprises data corresponding to positions where the second particle or electromagnetic radiation beam interacts with the at least one particle or electromagnetic radiation detector;
(iii) identify positional data subsets that are common to both the first and second datasets, and generate a mean detector response function (MDRF) for the at least one particle or electromagnetic radiation detector from the common positional data subsets; and
(iv) perform an imaging scan of an object utilizing the at least one particle or electromagnetic radiation detector, estimating the position of each interaction event within the detector, and generating, enhancing and/or adjusting an image based on the generated MDRF.

13. The system of claim 12 wherein the at least one particle or electromagnetic radiation detector comprises an edge readout detector or a monolithic crystal detector.

14. The system of claim 12 wherein the at least one particle or electromagnetic radiation detector further comprises a light guide able to transmit scintillation photons exiting the at least one scintillator crystal to the one or more photodetectors, and further comprises a photomultiplier positioned between the at least one scintillator crystal and one or more photodetectors.

15. The system of claim 12 wherein said microprocessor is further configured to:
illuminate the at least one particle or electromagnetic radiation detector with a third particle or electromagnetic radiation beam in a third defined region in the at least one particle or electromagnetic radiation detector, and generate a third dataset, wherein the third dataset comprises data corresponding to positions where the third particle or electromagnetic radiation beam interacts with the at least one particle or electromagnetic radiation detector, and identify positional data subsets that are common to the first, second and third datasets, and generate a mean detector response function (MDRF) for the at least one particle or electromagnetic radiation detector from the common positional data subsets, wherein the first region is in a first plane and the third region is in a second plane which is oriented at an angle between 0 to 90 degrees to the first plane, and the generated MDRF is a three-dimensional MDRF.

16. The system of claim 12 wherein the means for illuminating the selected regions of the at least one particle or electromagnetic radiation detector comprises a slit able to shape the particle or electromagnetic radiation beams into a linear shape, rectangular shape, circular shape, oval shape, cone shape, triangular shape, polygonal shape, or irregular shape.

17. The system of claim 12 further comprising a mask positioned over the at least one particle or electromagnetic radiation detector, wherein said mask blocks one or more portions of the particle or electromagnetic radiation beams from illuminating over the at least one particle or electromagnetic radiation detector.

18. The system of claim 12 wherein the electromagnetic radiation is selected from the group consisting of: gamma-rays, X-rays, visible light, UV light, and combinations thereof.

19. The system of claim 12 wherein the at least one particle or electromagnetic radiation detector is a gamma-ray detector or X-ray detector and the particle or electromagnetic radiation beams are gamma-ray beams or X-ray beams.

20. The system of claim 12 wherein the at least one particle or electromagnetic radiation detector is a particle detector, and the particle or electromagnetic radiation beams are particle beams comprising particles selected from the group consisting of protons, electrons, neutrons, ions, alpha particles, beta particles, and combinations thereof.

* * * * *